United States Patent [19]

Opperthauser

[11] Patent Number: 4,724,947
[45] Date of Patent: Feb. 16, 1988

[54] WORKPIECE LOADER FOR CONVEYORS

[75] Inventor: Keith G. Opperthauser, Holly, Mich.

[73] Assignee: Automated Systems, Inc., Pontiac, Mich.

[21] Appl. No.: 856,800

[22] Filed: Apr. 28, 1986

[51] Int. Cl.⁴ ............................................. B65G 47/26
[52] U.S. Cl. .................................... 198/433; 198/453; 198/463.4
[58] Field of Search .................. 198/433, 463.4, 456, 198/453, 418, 420, 429, 430

[56] References Cited

U.S. PATENT DOCUMENTS

| | | |
|---|---|---|
| 1,883,369 | 10/1932 | Hardman . |
| 1,911,093 | 5/1933 | Shackelford . |
| 2,526,983 | 10/1950 | Wait ................................... 198/429 |
| 2,587,959 | 3/1952 | Biner . |
| 2,687,797 | 8/1954 | Hirsch et al. ....................... 198/433 |
| 2,744,610 | 5/1956 | Stiles ................................... 198/433 |
| 2,951,574 | 9/1960 | Craig ............................... 198/433 X |
| 3,051,292 | 8/1962 | Sundquist et al. . |
| 3,179,231 | 4/1965 | Craig ................................. 198/420 |
| 3,557,932 | 1/1971 | Laub . |
| 3,561,626 | 2/1971 | Sprague ......................... 198/453 X |
| 3,866,739 | 2/1975 | Sikorski ............................... 198/453 |
| 3,923,144 | 12/1975 | Langen . |
| 3,987,889 | 10/1976 | Godoy ................................ 198/429 |
| 4,199,050 | 4/1980 | Moller . |
| 4,219,112 | 8/1980 | Loewenthal . |
| 4,343,390 | 8/1982 | Laub .................................. 198/429 |

FOREIGN PATENT DOCUMENTS 801564  9/1958  United Kingdom ................ 198/420

Primary Examiner—Joseph E. Valenza
Assistant Examiner—Jonathan D. Holmes
Attorney, Agent, or Firm—Harness, Dickey & Pierce

[57] ABSTRACT

This invention relates to a workpiece loader which loads workpieces onto a continuously moving conveyor of a type frequently used in manufacturing factory environments. The workpiece loader is comprised of a short length endless belt which is intermittently moved to stack workpieces against a movable fence. Movement of the movable fence is coordinated with motion of the loader belt to enable groups of workpieces to be placed on the conveyor as desired. A first embodiment discloses the workpiece loader belt travelling in a direction perpendicular to the continuously moving conveyor, whereas the second embodiment discloses such belts moving in parallel directions.

3 Claims, 3 Drawing Figures

U.S. Patent  Feb. 16, 1988  Sheet 1 of 2  4,724,947

WORKPIECE LOADER FOR CONVEYORS

BACKGROUND OF THE INVENTION

This invention relates to a workpiece loading apparatus and method particularly adapted for loading workpieces onto a belt-type transport conveyor of a type typically used in manufacturing facilities.

In the process of manufacturing articles, it is typically necessary to transport them from one location or work station to another. A number of belt-type conveyors are frequently employed for this purpose. Ordinarily, an operator is required to manually load individual workpieces onto the transport conveyor, and it is further sometimes necessary to carefully place a certain number of workpieces on the conveyor in a certain order. These requirements increase cost of processing workpieces since they represent labor intensive procedures. It is therefore desirable to provide a means for loading workpieces onto a conveyor in an orderly form which reduces or eliminates the need for direct labor. During the manufacturing process, the processing rates of various work stations can differ, or they may be out of phase such that, during certain periods of operation, an excess of workpieces becomes available at one work station, while at other periods, the demand of workpieces exceeds the supply. It is, accordingly, further desirable to provide a buffer which absorbs workpieces between work stations to enable the flow of workpieces to be maintained at a more constant rate.

In accordance with this invention, a workpiece loading apparatus is provided which enables workpieces to be loaded onto a continously moving belt-type conveyor. The workpiece loader is comprised of a separate, relatively short length endless belt which moves workpieces against a movable fence. The workpiece loader in accordance with this invention automatically orients the workpieces and places them in a densely packed order against the movable fence. Periodic actuation of the movable fence results in a desired number of workpieces being loaded onto the moving transport conveyor. Various embodiments of a workpiece loader for a conveyor according to this invention are described in this specification.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
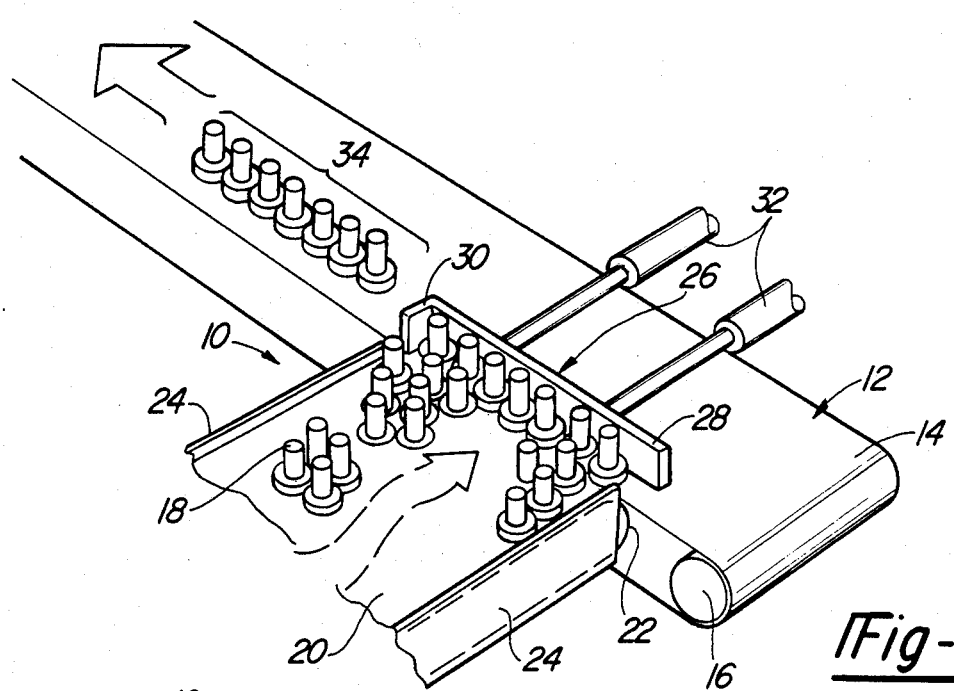
FIG. 1 is a pictorial view of a workpiece loader for a conveyor in accordance with a first embodiment of this invention shown with a belt-type transport conveyor and showing the movable fence in an extended position, causing workpieces to be stacked together in a densely packed form against the fence.
Figure 2:
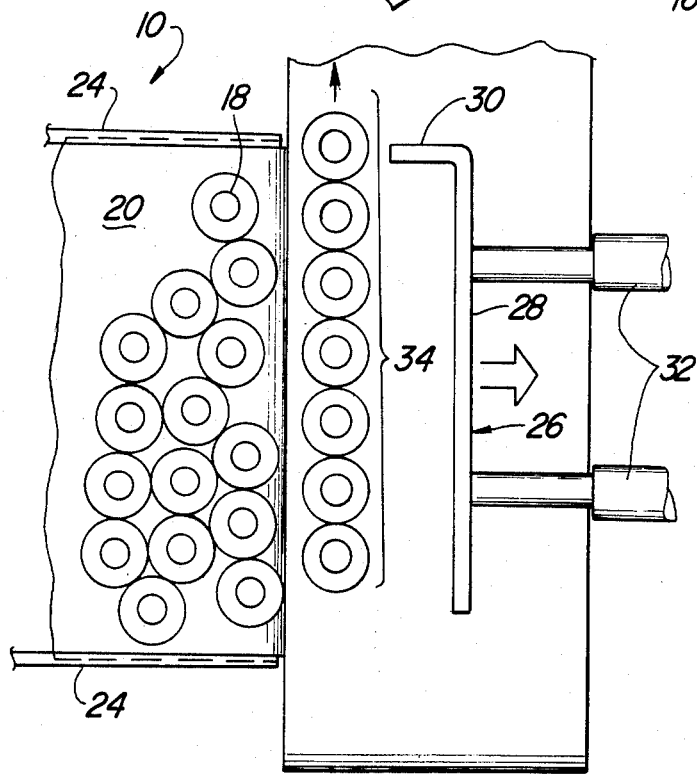
FIG. 2 is a top view of the workpiece loader shown in FIG. 1 showing the movable fence in a retracted position, thereby permitting workpieces to be transported by the conveyor.

A workpiece loader for a conveyor according to a first embodiment of this invention is generally designated by reference number 10 and is shown in FIGS. 1 and 2. Workpiece loader 10 is shown in the Figures for loading workpieces onto a continuously moving belt-type transport conveyor 12 of the type having an endless belt 14 which is supported and guided by rollers 16. Conveyor 12 is employed to transport workpieces 18 from one location to another for various manufacturing operations, storage, etc. In accordance with this invention, workpiece loader 10 is provided which is positioned adjacent conveyor 12 and loads workpieces onto the conveyor in an orderly manner.

Workpiece loader 10 is comprised of a relatively short length endless belt 20 and guide rollers 22. Workpiece loader 10 has a drive system which permits belt 20 to be incrementally advanced in one direction. Workpiece loader belt 20 has sufficient area to accommodate a desired number of workpieces 18. For the sake of illustration, workpieces 18 shown in the Figures herein are generally spindle-shaped articles. A broad range of workpieces may, however, be used with workpiece loader 10. Workpiece loader belt 20 is oriented such that it moves workpieces 18 in a direction perpendicular to the direction of movement of conveyor 12, and is positioned closely adjacent conveyor belt 14 enabling workpieces to be transferred between the belts. Workpieces 18 are confined on workpiece loader belt 20 by side fences 24 and movable fence 26. Movable fence 26 has a generally L-shaped configuration defined by elongated section 28 and perpendicular leg section 30. Movable fence 26 is adapted to be moved from the extended position shown in FIG. 1 to the retracted position shown in FIG. 2. Movement of fence 26 is controlled by fence actuator cylinders 32 which may be driven by any means including pneumatic or hydraulic systems.

During operation of workpiece loader 10, conveyor belt 14 is continuously moving. Workpieces 18 are loaded onto workpiece loader belt 20 at its end opposite fence 26. Although direct labor may be necessary to load workpieces 18 onto loader 10, such loading does not require the workpieces to be precisely ordered, and further, it is not necessary to load the workpieces at a particular rate. Workpiece loader belt 20 is advanced, thereby forcing individual workpieces 18 into engagement with movable fence 26 which is in the extended position. Due to the movement of belt 20 and the confinement provided by side fences 24 and movable fence 26, workpieces 18 are caused to become densely packed together even though they are loaded onto belt 20 in an unordered manner. As long as movable fence 26 remains in the extended position shown in FIG. 1, the workpieces 18 are unable to be transported along conveyor belt 14 due to the presence of leg section 30 of the movable fence. When it is desired to load workpieces 16 onto transport conveyor 12, a control command causes workpiece loader belt 20 to stop moving and causing fence actuators 32 to move fence 26 to the retracted position shown in FIG. 2. Once movable fence 26 is in the retracted position, a group of workpieces 18 in contact with movable fence 26, designated as 34, are no longer configured and are freed to move with conveyor 12, as shown in FIG. 2. Once each of workpieces of group 34 shown in FIG. 2 clears fence leg section 30, movable fence 26 is caused to move to the extended position shown in FIG. 1 and movement of belt 20 resumes, and another operational cycle begins. The large area of belt 20 compared to the size of individual workpieces 18 enables a number of such workpieces to be stored thereon, thus providing a workpiece storing buffer. This buffer enables loader 10 to be loaded in batches, even though a continuous flow of workpieces must be loaded onto transport conveyor 12.

The control mechanisms for coordinating the movement of workpiece loader belt 20 and fence actuators 32 may operate on a time basis, or systems for sensing the presence of workpieces 18 can be used such that, when group 34 of the workpieces has cleared movable fence 26, the operational cycle may be repeated. Other control systems could be employed which would coordinate loading of workpieces 18 onto conveyor 12 in accordance with the demand for such workpieces at a downstream work station.

Figure 3:
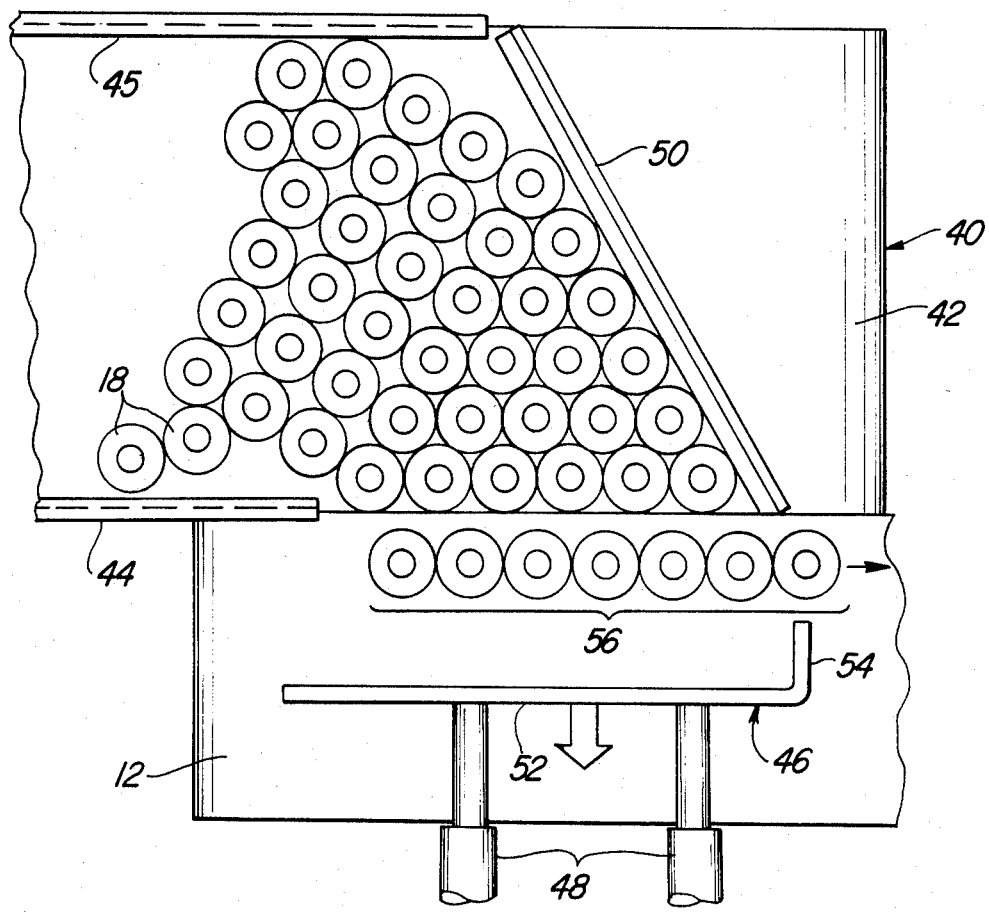
FIG. 3 is a top view of a workpiece loader for a conveyor in accordance with a second embodiment of this invention showing an alternate relative orientation between the workpiece loader and conveyor.

FIG. 3 illustrates a second embodiment of a workpiece loader 40 in accordance with this invention. Workpiece loader 40 varies principally from loader 10 in that belt 42 of the loader is oriented with respect to conveyor belt 12 such that it travels in a direction parallel to the direction of movement of belt 12. This configuration may be desired where plant layout constraints would prevent the use of workpiece loader 10, as previously described, which extends in a direction generally perpendicular to the direction of travel of conveyor belt 12. Workpiece loader 40 also differs from loader 10 by the use of stationary fence 50. Like loader 10, loader 40 includes side fences 44 and 45, movable fence 46 and fence actuators 48. Movable fence 46 also includes elongated section 52 and perpendicular leg section 54. In operation, workpieces 18 are moved by workpiece loader belt 42 and forced into engagement with stationary fence 50. Stationary fence 50 and movable fence 46 combine to provide the dense packing feature described previously in connection with the first embodiment. As shown in FIG. 3, stationary fence 50 is oriented such that equilateral triangles are defined by the centers of adjacent workpieces. This orientation of fence 50 provides the desired dense packing feature and further enables the workpieces to smoothly change directions. When movable fence 46 is moved to the retracted position, workpieces which are loaded against the movable fence, designated as group 56, are discharged onto conveyor belt 12. The periodic movement of workpiece loader belt 42 and movable fence 46 is coordinated as described in connection with the first embodiment.

While the above description constitutes the preferred embodiments of the present invention, it will be appreciated that the invention is susceptible to modification, variation and change without departing from the proper scope and fair meaning of the accompanying claims.

What is claimed is:

1. A workpiece loader for a continuously moving transport conveyor which enables groups of said workpieces to be loaded onto said conveyor, comprising:
   a loader belt moving in a direction perpendicular to the direction of movement of said transport conveyor, said loader belt providing for random orientation or workpieces onto said belt, and said loader belt positioned adjacent said conveyor such that said workpieces may be transported from said loader belt to said conveyor,
   a movable L-shaped fence including an elongated portion extending parallel to the direction of motion of said conveyor and a leg portion joining said elongated portion at a downstream end thereof and extending perpendicularly from said elongated portion toward said loader belt,
   movable fence actuation means for moving said movable L-shaped fence in a direction transverse to the direction of motion of said transport conveyor between a first position adjacent said loader belt and a second position displaced from said loader belt,
   controller means for causing said fence actuation means to move said L-shaped fence to said first position, cause said loader belt to move, thereby causing said randomly orientated workpieces on said loader belt to become densely packed against one another and said movable L-shaped fence and causing a group of said workpieces to be placed in contact with said conveyor in a desired densely packed orientation but prevented from being transported by said conveyor by the leg portion of said L-shaped fence, said controller means further causing said loader belt to stop moving and then causing said fence actuation means to move said movable L-shaped fence to said second position in which the leg portion does not prevent transport of the workpieces, thereby enabling said densely packed group of workpieces to be transported by said conveyor.

2. A workpiece loader for a conveyor of the type having a continuously moving belt enabling groups of said workpieces to be loaded onto said conveyor, comprising:
   a loader belt moving in a direction parallel to the direction of movement of said conveyor belt, said loader belt providing for random orientation of workpieces onto said belt, and said loader belt positioned adjacent said conveyor belt such that said workpieces may be transported from said loader belt to said conveyor belt,
   a stationary fence means positioned over said loader belt and angled with respect to the direction of motion of said loader belt for changing the direction of motion of said workpieces from the direction of motion of said loader belt to a direction perpendicular to the direction motion of said loader belt,
   a movable L-shaped fence including an elongated portion extending parallel to the direction of motion of said conveyor belt and a leg portion joining said elongated portion at a downstream end thereof and extending perpendicularly from said elongated portion toward said loader belt,
   movable fence actuation means for moving said movable fence in a direction transverse to the direction of motion of said conveyor belt between a first position adjacent said loader belt and a second position displaced from said loader belt,
   controller means for causing said fence actuation means to move said L-shaped fence to said first position, cause said loader belt to move thereby causing said randomly orientated workpieces deposited on said loader belt to become densely packed against one another and said L-shaped fence and causing said group of workpieces to be placed in contact with said conveyor belt in a desired densely packed orientation but prevented from being transported by said conveyor belt by the leg portion of said L-shaped fence, said controller means further causing said loader belt to stop moving and then causing said fence actuation means to move said L-shaped fence to said second position in which the leg portion does not prevent transport of the workpieces, thereby enabling said group of densely packed workpieces to be transported by said conveyor.

3. A method of loading groups of workpieces onto a continuously moving conveyor belt, comprising:
- providing a loader belt and a movable L-shaped fence having an elongated portion extending parallel to said conveyor belt and a leg portion extending perpendicularly from said elongated portion toward said loader belt,
- randomly loading workpieces onto said loader belt,
- moving said L-shaped fence to a first position adjacent said loader belt,
- moving said loader belt causing a group of said workpieces to be placed in contact with said conveyor belt and densely packed against said movable fence,
- orientating said densely packed workpieces against one another on said L-shaped fence in a desired densely packed orientation,
- stopping movement of said loader belt,
- moving said movable L-shaped fence from said first position in which movement of said densely packed workpieces is prevented by said leg portion to a second position displaced away from said loader belt in which said leg portion does not prevent movement of the workpieces, thereby enabling said group of workpieces to be transported on said conveyor belt.

* * * * *